United States Patent
Isaka et al.

(10) Patent No.: US 12,537,930 B2
(45) Date of Patent: Jan. 27, 2026

(54) FIELD EXPANSION DEVICE, FIELD EXPANSION METHOD, FIELD EXPANSION PROGRAM, AND FIELD EXPANSION SYSTEM

(71) Applicant: NTT, Inc., Tokyo (JP)

(72) Inventors: Takeru Isaka, Musashino (JP); Shinya Shimizu, Musashino (JP); Shiro Ozawa, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/836,786

(22) PCT Filed: Feb. 15, 2022

(86) PCT No.: PCT/JP2022/005827
§ 371 (c)(1),
(2) Date: Aug. 8, 2024

(87) PCT Pub. No.: WO2023/157053
PCT Pub. Date: Aug. 24, 2023

(65) Prior Publication Data
US 2025/0168317 A1    May 22, 2025

(51) Int. Cl.
H04N 13/00 (2018.01)
H04N 13/122 (2018.01)
H04N 13/128 (2018.01)
H04N 13/139 (2018.01)
H04N 13/156 (2018.01)
(Continued)

(52) U.S. Cl.
CPC ......... *H04N 13/327* (2018.05); *H04N 13/122* (2018.05); *H04N 13/128* (2018.05); *H04N 13/139* (2018.05); *H04N 13/156* (2018.05); *H04N 23/698* (2023.01)

(58) Field of Classification Search
None
See application file for complete search history.

(56) References Cited

U.S. PATENT DOCUMENTS

2019/0219826 A1*   7/2019   Taketani ............ G02B 27/0172

FOREIGN PATENT DOCUMENTS

| JP | H10-206788 A | 8/1998 |
|----|--------------|--------|
| JP | H1175142 A | 3/1999 |
| JP | 2001211403 A | 8/2001 |

(Continued)

OTHER PUBLICATIONS

Liang et al., "OmniView: An Exploratory Study of 360 Degree Vision using Dynamic Distortion based on Direction of Interest", Proceedings of the Augmented Humans International Conference, Mar. 16-17, 2020, 10 pages.

(Continued)

*Primary Examiner* — Zhihan Zhou
(74) *Attorney, Agent, or Firm* — XSENSUS LLP

(57) ABSTRACT

A field-of-view expansion device includes processing circuitry configured to acquire an image around a user captured by a camera installed in a vicinity of the user, convert an image outside a center visual field of the user of the image acquired to naturally connect to a vision of the center visual field of the user, and display the image converted on a display disposed in right and left peripheral visual fields of the user across the center visual field of the user.

9 Claims, 8 Drawing Sheets

(51) Int. Cl.
    *H04N 13/327*    (2018.01)
    *H04N 23/698*    (2023.01)

(56) References Cited

FOREIGN PATENT DOCUMENTS

| JP | 2004088395 A | 3/2004 |
|---|---|---|
| JP | 2007-199593 A | 8/2007 |
| JP | 5439281 B2 | 3/2014 |
| JP | 2017142294 A | 8/2017 |
| JP | 2019-125965 A | 7/2019 |
| JP | 2020002486 A | 1/2020 |
| JP | 2021015572 A | 2/2021 |

OTHER PUBLICATIONS

Baričević et al., "User-Perspective AR Magic Lens from Gradient-Based IBR and Semi-Dense Stereo", IEEE Transactions on Visualization and Computer Graphics, vol. 23, No. 7, Jul. 2017, pp. 1838-1851.

* cited by examiner

FIELD EXPANSION DEVICE, FIELD EXPANSION METHOD, FIELD EXPANSION PROGRAM, AND FIELD EXPANSION SYSTEM

CROSS-REFERENCE TO RELATED APPLICATION

The present application is a national stage application, pursuant to 35 U.S.C. § 371, of International Patent Application No. PCT/JP2022/005827, filed on Feb. 15, 2022, the entire contents of which are incorporated herein by reference.

TECHNICAL FIELD

The present invention relates to a field-of-view expansion device, a field-of-view expansion method, a field-of-view expansion program, and a field-of-view expansion system.

BACKGROUND ART

Since the human eyes are directed forward, an angle of view in a horizontal direction is at most about 200°, centered on the front, and there is a blind spot at the rear. Therefore, there may be cases of not being conscious of the approach of a dangerous object such as a vehicle or a suspicious person and being involved in an accident or a crime. In addition, in order to obtain the visual information of the entire vicinity at a place such as in a scenic landscape, it is necessary to move the neck and the body and change the point of view. In order to solve such problems, many field-of-view expansion techniques have been proposed so far. For example, a technique for projecting an image obtained by a camera onto a head-mounted display (HMD) has been proposed (see NPL 1).

CITATION LIST

Non Patent Literature

[NPL 1] Liang, Feng, et al., "OmniView; An Exploratory Study of 360Degree Vision using Dynamic Distortion based on Direction of Interest", Proceedings of the Augmented Humans International Conference. 2020.

[NPL 2] Domagoj Baricevic, et al., "User-Perspective AR Magic Lens from Gradient-Based IBR and Semi-Dense Stereo", IEEE TRANSACTIONS ON VISUALIZATION AND COMPUTER GRAPHICS 23.7 (2017): 1838-1851.

SUMMARY OF INVENTION

Technical Problem

However, in the technique of projecting the image obtained by the above-mentioned camera onto the HMD, there is a deviation between the actual appearance (the appearance with the naked eye) and the image on the HMD between the scale and the position of the visible object. Therefore, the above-mentioned technique has a problem that the sense of distance to the real space is impaired. Therefore, an object of the present invention is to prevent the user's sense of distance from being lost in real space when expanding the visual field of the user.

Solution to Problem

In order to solve the above problem, the field-of-view expansion device includes processing circuitry configured to acquire an image around a user captured by a camera installed in a vicinity of the user, convert an image outside a center visual field of the user of the image acquired to naturally connect to a vision of the center visual field of the user, and display the image converted on a display disposed in right and left peripheral visual fields of the user across the center visual field of the user.

Advantageous Effects of Invention

According to the present invention, when expanding the visual field of the user, it is possible to prevent the user's sense of distance from being lost in real space.

DESCRIPTION OF EMBODIMENTS

Hereinafter, modes (embodiments) for carrying out the present invention will be divided into a first embodiment and a second embodiment and described with reference to the drawings. The present invention is not limited to each embodiment described below.

Figure 1:
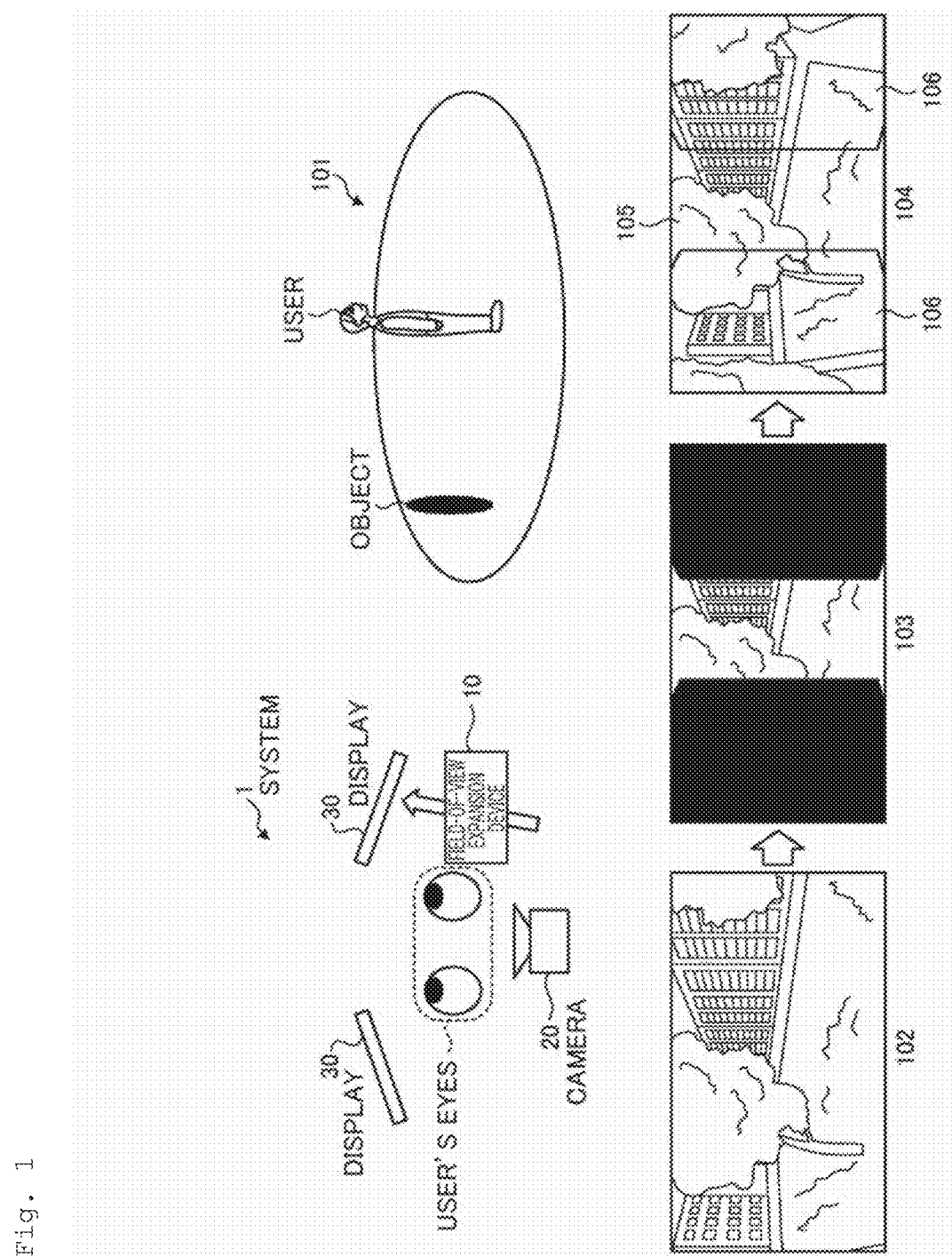
FIG. 1 is a diagram illustrating an overview of a field-of-view expansion system (system) of a first embodiment.

[First Embodiment] First, an overview of a field-of-view expansion system (system) 1 of a first embodiment will be described with reference to FIG. 1. As illustrated in FIG. 1, the system 1 includes a camera 20, a display 30, and a field-of-view expansion device 10. FIG. 1 is a diagram of the system 1 viewed from above.

The camera 20 is disposed in the vicinity of the user (for example, on the head of the user), and captures the center visual field of the user and the image outside the center visual field. The camera 20 is realized by, for example, a camera capable of photographing the entire vicinity of the user. The camera 20 also captures an object (refer to reference numeral 101) outside the visual field of the user, for example.

The display 30 is disposed at a position covering the peripheral visual field of the user. According to such a display 30, a user can view the center visual field with the naked eye, and can view the outside of the center visual field with an image displayed on the display 30.

The field-of-view expansion device 10 displays an image outside the center visual field of the user among the images obtained from the camera 20 on the display 30. Here, the field-of-view expansion device 10 performs image conversion processing to naturally connect to the vision of the center visual field of the user (that is, the vision with the naked eye of the user) when displaying the image outside the center visual field of the user obtained from the camera 20 on the display 30.

The vision indicated by reference numeral 102 in FIG. 1 is an example of the vision viewed by the user with the naked eye. The vision indicated by reference numeral 103 is an example of the vision of the user in a state where the user wears the display 30 and no image is displayed yet. The vision indicated by reference numeral 104 is an example of the vision of the user in a state where the image is displayed on the display 30.

For example, an image of the vision outside the center visual field (reference 106) is naturally connected to the vision (reference 105) of the center visual field viewed by the user with the naked eye, and displayed on the display 30 in a state that the appearance up to the back of the user is compressed, According to such a system 1, a user can view the center visual field with the naked eye, and can view an image naturally connected to the vision of the center visual field by the display 30 for the visual field outside the center visual field. Thus, the system 1 can prevent the sense of distance to the real space from being impaired when the visual expansion of the user is performed.

Figure 2:
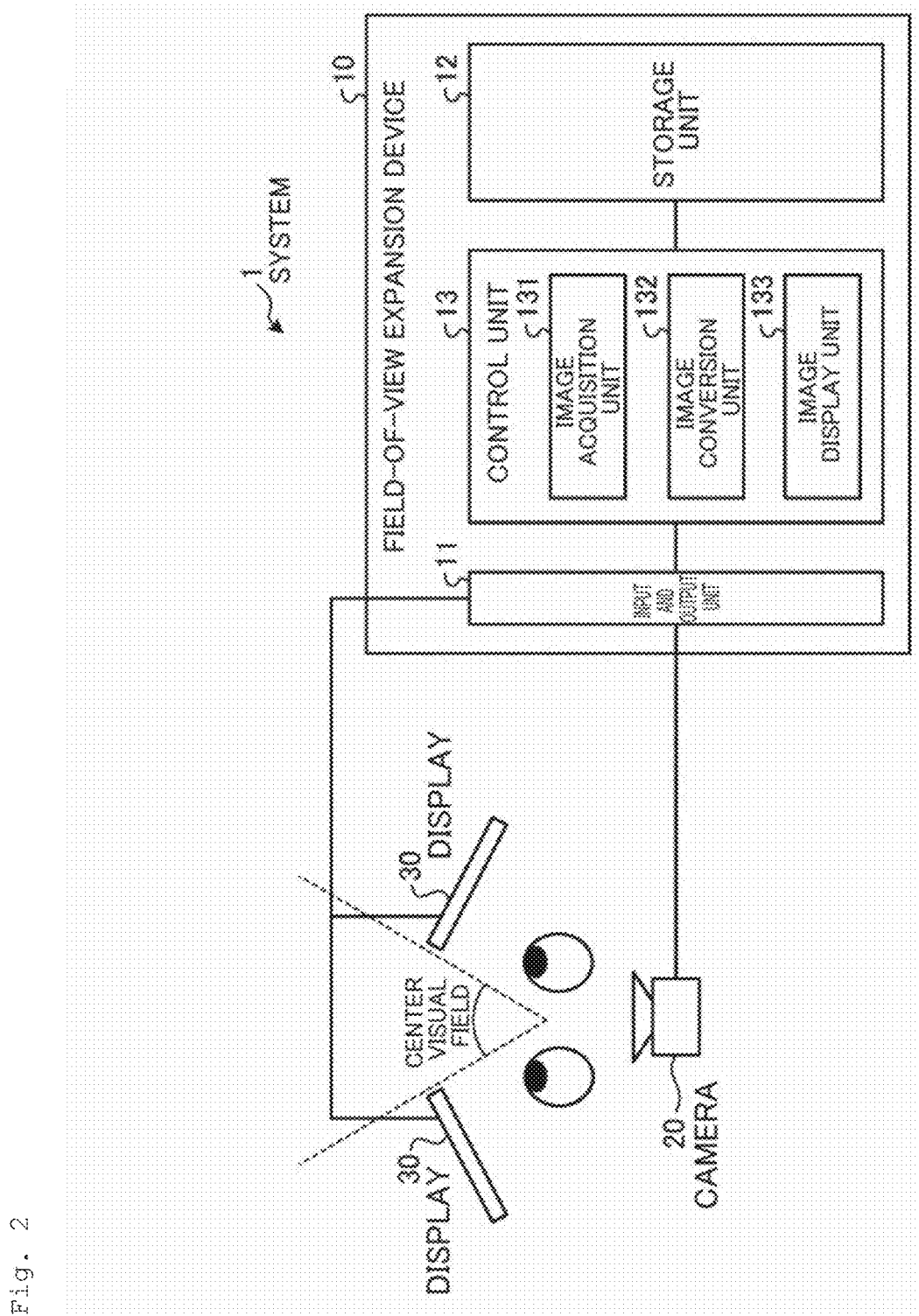
FIG. 2 is a diagram illustrating a configuration example of the system of the first embodiment.

Further, since the user can view the center visual field with the naked eye by the display 30, the user can easily visually recognize his/her hand and his/her own position. Also, even in a case where a failure occurs in the display 30 during the mounting of the display 30, the visual sense of the user is not taken away. Further, the other person can easily confirm the expression and the line of sight of the user wearing the display 30,

[Configuration Example] Next, a configuration example of the system 1 will be described with reference to FIG. 2. A system 1 includes the display 30, the camera 20, and the field-of-view expansion device 10.

The display 30 is disposed at a position for covering a peripheral visual field of a user (for example, visual fields on both right and left sides across a center visual field of the user). For example, the display 30 is disposed to sandwich the center visual field of the user and cover the user's left and right peripheral visual fields by means of an instrument (for example, glasses) worn near the user's eyes. The display 30 is realized by, for example, a liquid crystal display.

The camera 20 is disposed in the vicinity of the user (for example, on the head of the user or the like), and captures an image around the user. A plurality of cameras 20 may be provided.

The field-of-view expansion device 10 performs conversion processing on the image acquired from the camera 20 and displays the image on the display 30. The field-of-view expansion device 10 is communicatively connected to the camera 20 and the display 30 by wire or wirelessly.

The field-of-view expansion device 10 includes an input and output unit 11, a storage unit 12, and a control unit 13. The input and output unit 11 is an interface for performing input and output of various types of signal with external devices such as the display 30 and the camera 20. The storage unit 12 stores data referred to by the control unit 13 when executing various types of processing.

The control unit 13 controls the entire control of the field-of-view expansion device 10. The control unit 13 includes an image acquisition unit 131, an image conversion unit 132, and an image display unit 133.

The image acquisition unit 131 acquires an image around the user captured by the camera 20. The image conversion unit 132 extracts an image outside the center visual field of the user from the image acquired by the image acquisition unit 131. Then, the image conversion unit 132 converts the image outside the center visual field of the user to naturally connect to the vision of the center visual field of the user. For example, the image conversion unit 132 converts an image outside the center visual field of the user to naturally connect to the vision of the center visual field of the user using the technique described in Japanese Patent No. 5439281.

In addition, the image conversion unit 132 performs image conversion processing so that an image outside the center visual field of the user is stored in an image display area of the display 30. At this time, for example, the image conversion unit 132 converts the image outside the center visual field of the user into the image gradually compressed according to the distance from the center visual field, Thus, the sense of incongruity for the user when viewing the image on the display 30 can be reduced.

The image display unit 133 displays the image converted by the image conversion unit 132 on the display 30.

Figure 3:
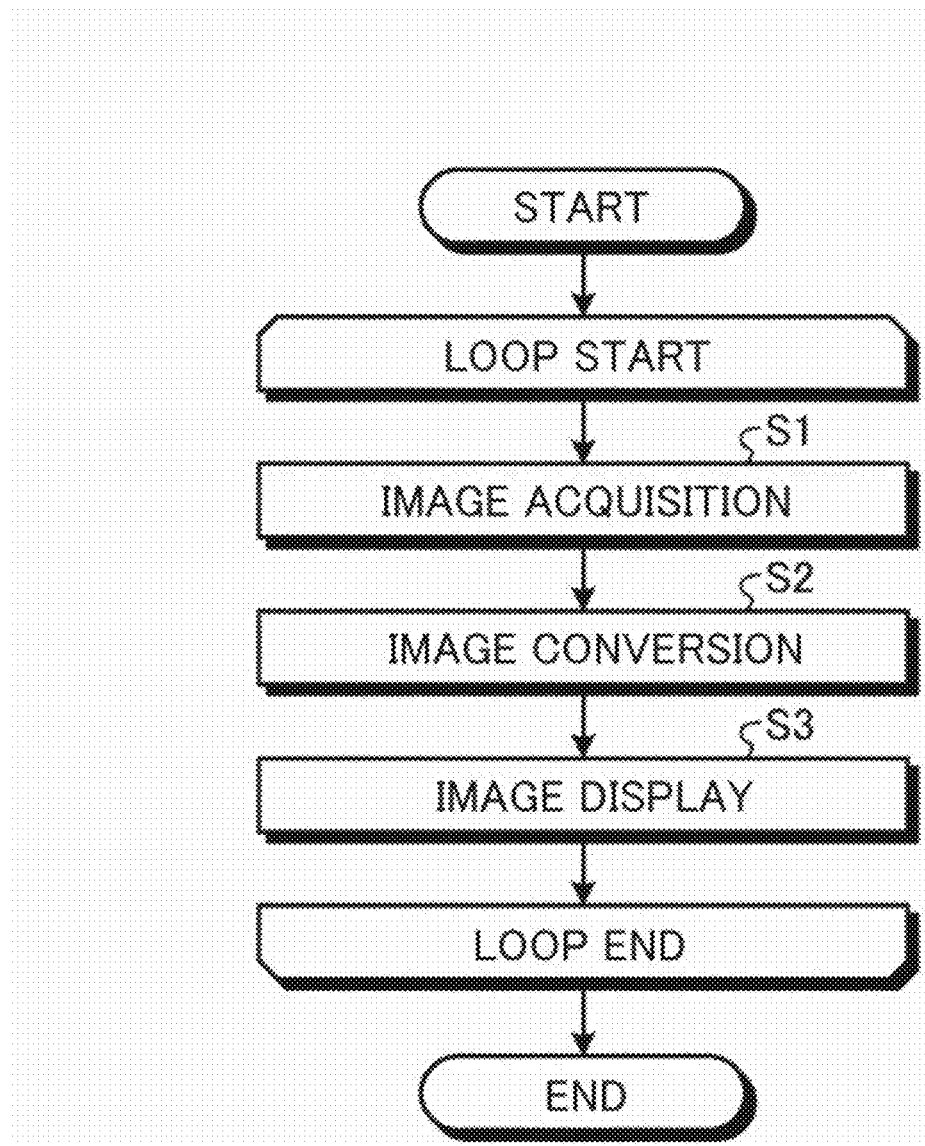
FIG. 3 is a flowchart illustrating an example of a processing procedure performed by a field-of-view expansion device of FIG. 2.

[Example of Processing Procedure] Next, an example of a processing procedure of the field-of-view expansion device 10 will be described with reference to FIG. 3. The field-of-view expansion device 10 executes the following S1 to S3 by loop processing.

First, the image acquisition unit 131 of the field-of-view expansion device 10 acquires an image around the user from the Camera 20 (S1: Image acquisition). Next, the image conversion unit 132 extracts an image outside the center visual field of the user from the image acquired by the image acquisition unit 131. Then, the image conversion unit 132 performs conversion processing of the image so that the image outside the center visual field of the user is stored in the image display area of the display 30, and then converts the image to naturally connect to the vision of the center visual field of the user (S2: Image Conversion). Thereafter, the image converted by the image conversion unit 132 is displayed on the display 30 (S3: Image Display).

According to the system 1 described above, the user can view the center visual field with the naked eye, and can view an image naturally connected to the vision of the center visual field by the display 30 for the visual field outside the center visual field. Thus, the system 1 can prevent the sense of distance to the real space from being impaired in the visual expansion of the user.

[Second Embodiment] Next, a system 1*a* of a second embodiment will be described with reference to FIG. 4. The same constituent elements as those in the first embodiment are denoted by the same reference numerals and a description thereof has been omitted.

Figure 4:
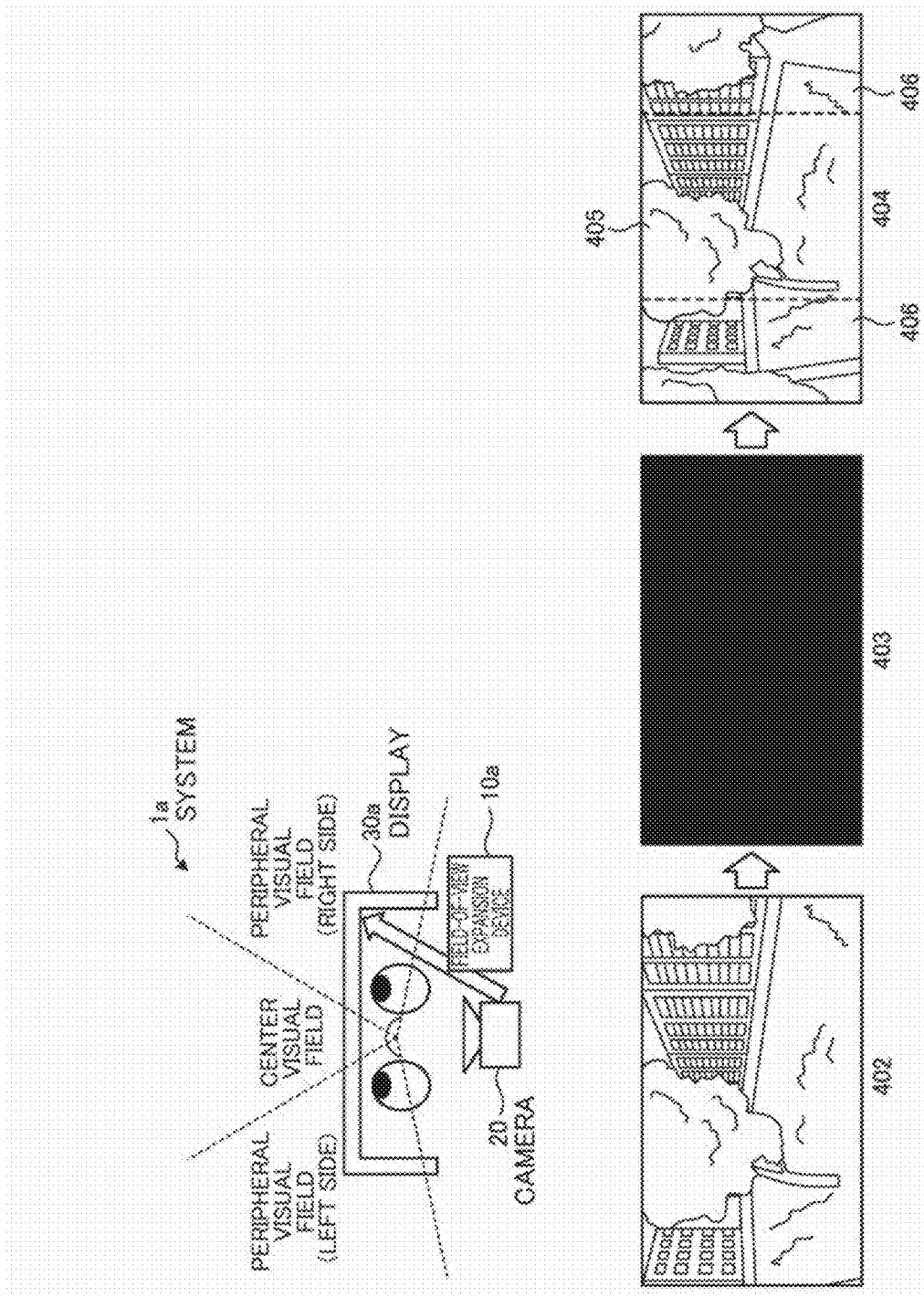
FIG. 4 is a diagram illustrating an overview of a system of a second embodiment.

As illustrated in FIG. 4, the system 1a includes, for example, a display 30*a* such as a head-mounted display (HMD), the camera 20, and a field-of-view expansion device 10*a* FIG. 4 is a view of the system 1*a* viewed from above.

The system 1 of the first embodiment described above provides a center visual field of the user with the naked eye using the display 30 that covers only the peripheral visual field of the user, On the other hand, the system 1*a* of the second embodiment uses the display 30*a* covering the center visual field of the user.

When the field-of-view expansion device 10*a* displays the image captured by the camera 20 on the display 30*a* as it is, a deviation is generated in the actual appearance between the image captured by the camera 20 and the actual center visual field. As a result, a sense of distance to a real space is impaired when a user views an image on the display 30*a*, Then, the field-of-view expansion device 10*a* displays an image obtained by converting the image of the center visual field of the user acquired from the camera 20 into the same level as the actual appearance in an area corresponding to the center visual field of the display 30a. By such a field-of-view expansion device 10a, even in a case where the display 30a such as an HMD is used, a sense of distance to a real space of a user can be prevented from being impaired.

Reference numeral 402 in FIG. 4 indicates an example of the vision viewed by the user with the naked eye. The vision indicated by reference numeral 403 is an example of the vision of the user in a state where the user wears the display 30a and the image is not yet displayed. The vision indicated by reference numeral 404 is an example of the vision of the user in a state where the image is displayed on the display 30a.

For example, an image converted to the same level as the actual appearance of the user is displayed in the area (reference numeral 405) of the center visual field of the display 30a. In the area (reference numeral 406) of the peripheral visual field of the display 30a, the image of the vision outside the center visual field is naturally connected to the image of the area (reference numeral 405) of the center visual field, and the image is displayed in a state that the appearance up to the back of the user is compressed.

Thus, the system 1a does not impair the sense of distance to the real space of the user even in a case where an existing HMD or the like is used.

Figure 5:
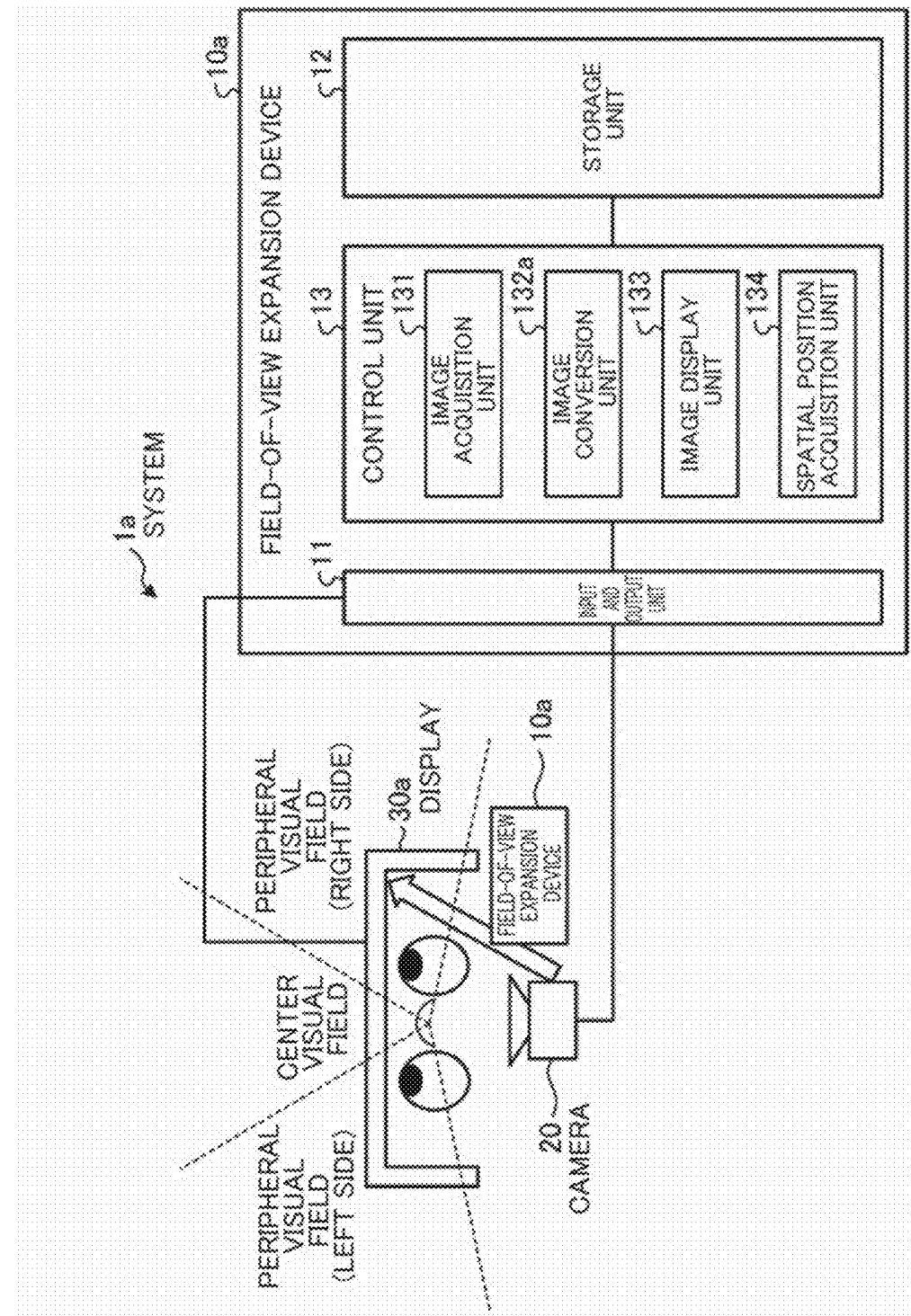
FIG. 5 is a diagram illustrating a configuration example of the system of the second embodiment.

[Configuration Example] Next, a configuration example of the system 1a will be described with reference to FIG. 5. The system 1a includes the display 30a, the camera 20, and the field-of-view expansion device 10a.

The display 30a is realized by, for example, a display such as an HMD covering the visual field of a user.

The control unit 13 of the field-of-view expansion device 10a includes the image acquisition unit 131, a spatial position acquisition unit 134, an image conversion unit 132a, and an image display unit 133.

The spatial position acquisition unit 134 acquires correspondence between each pixel of the image acquired by the image acquisition unit 131 and a position of each pixel in a real space.

As a method of acquiring correspondence between each pixel of the image and the position of each pixel in the real space, there is a method of utilizing depth information of the real space obtained from a stereo camera, for example, as described in NPL 2.

In a case where each pixel of the image can be associated with the position of each pixel in the real space only by the image acquired by the image acquisition unit 131, the spatial position acquisition unit 134 is not required.

The image conversion unit 132a converts the image of the center visual field of the user to coincide with the scale and position when the user views the center visual field with the naked eye based on the correspondence between the image acquired by the image acquisition unit 131 and the position of the image in the real space acquired by the spatial position acquisition unit 134.

In addition, the image conversion unit 132a performs image conversion processing so that the image outside the center visual field of the user is stored in the image display area of the peripheral visual field of the display 30a, similarly to the image conversion unit 132. Then, the image conversion unit 132a converts the image outside the center visual field of the user to naturally connect to the image of the vision of the center visual field of the user. The image conversion unit 132a converts the image outside the center visual field of the user into an image gradually compressed according to the distance from the center visual field, similarly to the image conversion unit 132.

Figure 6:
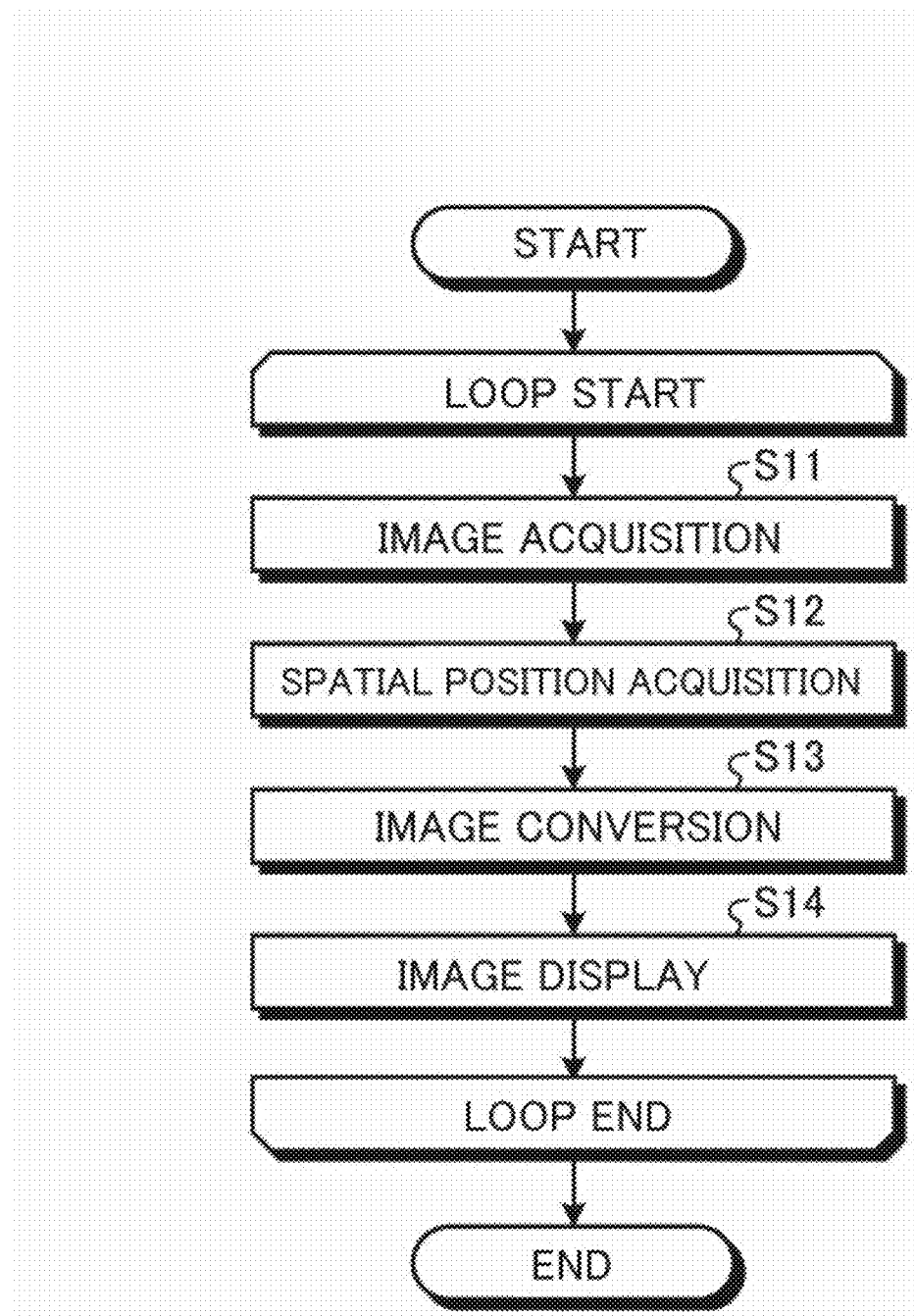
FIG. 6 is a flowchart illustrating an example of a processing procedure performed by a field-of-view expansion device of FIG. 5.

[Example of Processing Procedure] Next, an example of a processing procedure of the field-of-view expansion device 10a will be described with reference to FIG. 6. The field-of-view expansion device 10 executes the following S11 to S14 by loop processing.

First, the image acquisition unit 131 of the field-of-view expansion device 10a acquires an image around the user from the camera 20 (S11: Image Acquisition). Next, the spatial position acquisition unit 134 acquires correspondence between each pixel of the image acquired by the image acquisition unit 131 and a position of each pixel in a real space (S12: Spatial Position Acquisition).

Then, the image conversion unit 132a converts the image of the center visual field of the user based on the correspondence between the image acquired by the image acquisition unit 131 and the position of the image in the real space acquired by the spatial position acquisition unit 134, to match the scale and position when the user views the center visual field with the naked eye. In addition, the image conversion unit 132a performs conversion processing of the image so that the image outside the center visual field of the user is stored in the image display area of the peripheral visual field of the display 30a, and then converts the image to naturally connect to the image of the vision of the center visual field of the user (S13: Image Conversion). Thereafter, the image converted by the image conversion unit 132 is displayed on the display 30a (S14: Image Display).

According to the system 1a described above, the user can view the center visual field in the same way as the center visual field is viewed by the naked eyes, and the image naturally connected to the vision of the center visual field can be viewed by the display 30a for the visual field outside the center visual field. Thus, the system 1a can prevent the sense of distance to the real space from being impaired in the visual expansion of the user.

Figure 7:
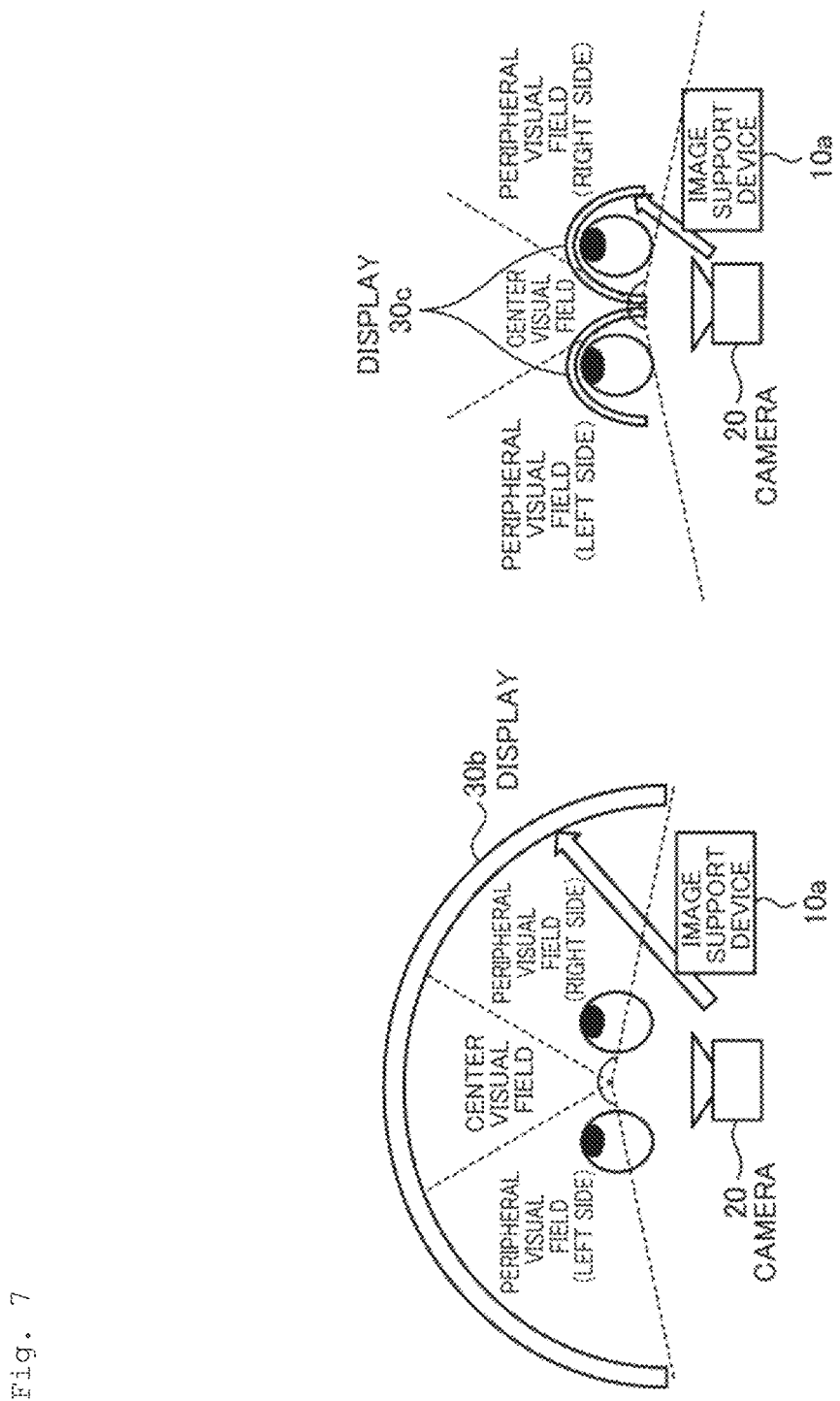
FIG. 7 is a diagram illustrating an example of a display in the system of the second embodiment.

[Other Embodiments] The display used by the system 1a may be, for example, a display 30b disposed to surround the field of view of the user as illustrated in FIG. 7, and a contact lens type display 30c. The display 30b may be, for example, one curved display as illustrated in FIG. 7 or a combination of a plurality of displays. The display used by the system 1a may be a smart glass type display.

[System Configuration, or the Like] Also, each constituent element of each part shown in the drawing is functionally conceptual and does not necessarily need to be physically configured as shown in the drawing. In other words, the specific forms of dispersion and integration of each apparatus are not limited to those illustrated in the drawings and all of or a part of the apparatus may be functionally or physically distributed or integrated in any unit depending on various loads, usage conditions, or the like. Furthermore, all or any part of each processing function performed by each device can be implemented by a CPU and a program executed by the CPU, or implemented as hardware based on wired logic, Also, out of the steps of processing described in the foregoing embodiment, all or some of the steps of processing described as being automatically executed may also be manually executed. Alternatively, all or some of the steps of processing described as being manually executed may also be automatically executed using a known method. In addition, the processing procedure, the control procedure, specific names, information including various types of data and parameters that are shown in the above document and drawings may be arbitrarily changed unless otherwise described.

[Program] The field-of-view expansion devices 10 and 10*a* can be implemented by installing a program (field-of-view expansion program) as package software or online software in a desired computer. For example, the information processing device is caused to execute the above program so that the information processing device functions as the field-of-view expansion devices 10 and 10*a*. The information processing device mentioned herein includes mobile communication terminals such as smart phones, mobile phones and personal handyphone systems (PHS) and terminals such as personal digital assistants (PDAs).

Figure 8:
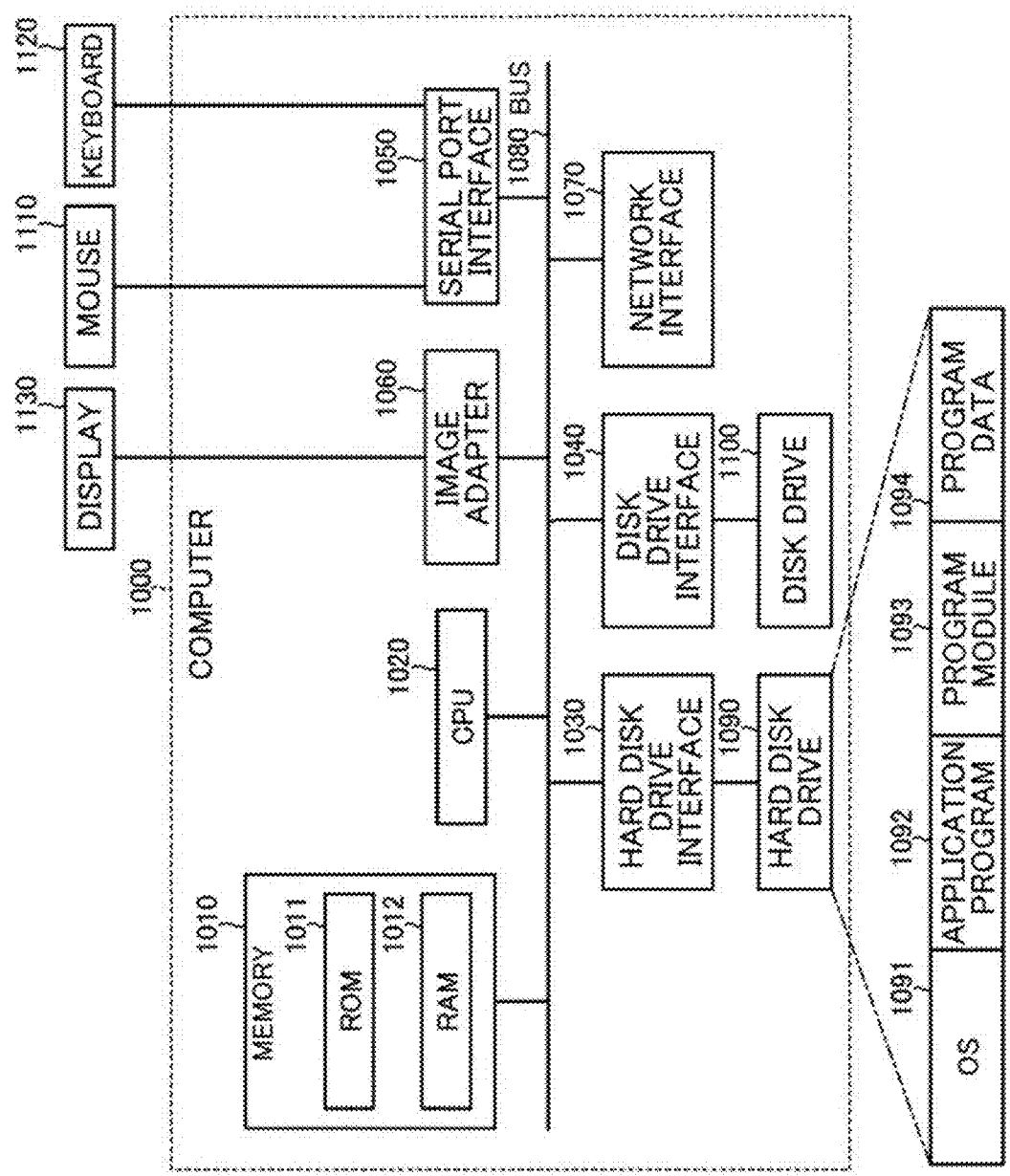
FIG. 8 is a diagram illustrating a configuration example of a computer for executing a field-of-view expansion program.

FIG. 8 is a diagram illustrating an example of a computer that executes a field-of-view expansion program. A computer 1000 includes, e.g., a memory 1010 and a CPU 1020. Further, the computer 1000 also includes a hard disk drive interface 1030, a disk drive interface 1040, a serial port interface 1050, an image adapter 1060, and a network interface 1070. These units are connected to one another via a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The image adapter 1060 is connected to, for example, a display 30130.

The hard disk drive 1090 stores, for example, an OS 1091, an application program 1092, a program module 1093, and program data 1094. That is, a program for defining each type of processing executed by the above-described field-of-view expansion devices 10 and 10*a* is implemented as the program module 1093 in which computer-executable code is described. The program module 1093 is stored in, e.g., the hard disk drive 1090. For example, the program module 1093 for executing processing corresponding to the functional configuration of the field-of-view expansion devices 10 and 10*a* is stored in the hard disk drive 1090. Note that the hard disk drive 1090 may be replaced with a solid state drive (SSD), In addition, data used in processing in each embodiment described above is stored as the program data 1094 in, for example, the memory 1010 or the hard disk drive 1090, Furthermore, the CPU 1020 reads out the program module 1093 or the program data 1094 stored in the memory 1010 or the hard disk drive 1090 to the RAM 1012 and executes the program module 1093 as necessary.

Note that the program module 1093 and the program data 1094 are not limited to being stored in the hard disk drive 1090, and may be stored in, for example, a detachable storage medium and read by the CPU 1020 via the disk drive 1100 or the like. Alternatively, the program module 1093 and the program data 1094 may be stored in another computer connected via a network (local area network (LAN), wide area network (WAN), or the like). Also, the program module 1093 and the program data 1094 may be read by the CPU 1020 through the network interface 1070 from other computers.

REFERENCE SIGNS LIST

1, 1*a* Field-of-view expansion system
10, 10*a* Field-of-view expansion device
11 Input and output unit
12 Storage unit
13 Control unit
131 Image acquisition unit
132, 132*a* Image conversion unit
133 Image display unit
134 Spatial position acquisition unit

The invention claimed is:

1. A field-of-view expansion device comprising:
processing circuitry configured to:
 acquire an image around a user captured by a panoramic camera installed in a vicinity of the user;
 convert an image outside a center visual field of the user of the acquired image such that (i) a representation of the image outside the center visual field of the user is compressed depending on the distance from the center visual field of the user and (ii) the representation of the image naturally connects to a vision of the center visual field of the user, wherein the representation of the image includes a compressed appearance of the backside of the user; and
 display the converted image on a display disposed in right and left peripheral visual fields of the user across the center visual field of the user.

2. The field-of-view expansion device according to claim 1, wherein the processing circuitry is further configured to;
convert an image of the center visual field of the user to coincide with a scale and a position when the user views the center visual field with a naked eye based on a correspondence between each pixel of the acquired image and a position of each pixel in real space; and
display the converted image of the center visual field on a display disposed in the center visual field of the user.

3. The field-of-view expansion device according to claim 2, wherein the processing circuitry is further configured to acquire a correspondence between each pixel of the acquired image and a position of each pixel in the real space using depth information of each position in the real space obtained from a stereo camera.

4. A field-of-view expansion method executed by a field-of-view expansion device, the field-of-view expansion method comprising:
acquiring an image around a user captured by a panoramic camera installed in a vicinity of the user;
converting an image outside a center visual field of the user of the acquired image such that (i) a representation of the image outside the center visual field of the user is compressed depending on the distance from the center visual field of the user and (ii) the representation of the image naturally connects to a vision of the center visual field of the user, wherein the representation of the image includes a compressed appearance of the backside of the user; and
displaying the converted image on a display disposed in right and left peripheral visual fields of the user across the center visual field of the user.

5. The field-of-view expansion method according to claim 4, further comprising:
converting an image of the center visual field of the user to coincide with a scale and a position when the user views the center visual field with a naked eye based on a correspondence between each pixel of the acquired image and a position of each pixel in real space; and
displaying the converted image of the center visual field on a display disposed in the center visual field of the user.

6. The field-of-view expansion method according to claim 4, further comprising acquiring a correspondence between each pixel of the acquired image and a position of each pixel in the real space using depth information of each position in the real space obtained from a stereo camera.

7. A non-transitory computer-readable recording medium storing therein a field-of-view expansion program that causes a computer to execute a process comprising:

acquiring an image around a user captured by a panoramic camera installed in a vicinity of the user;

converting an image outside a center visual field of the user of the acquired image such that (i) a representation of the image outside the center visual field of the user is compressed depending on the distance from the center visual field of the user and (ii) the representation of the image naturally connects to a vision of the center visual field of the user, wherein the representation of the image includes a compressed appearance of the backside of the user;

displaying the converted image on a display disposed in right and left peripheral visual fields of the user across the center visual field of the user.

8. The non-transitory computer-readable recording medium according to claim 7, wherein the process further comprises:

converting an image of the center visual field of the user to coincide with a scale and a position when the user views the center visual field with a naked eye based on a correspondence between each pixel of the acquired image and a position of each pixel in real space; and displaying the converted image of the center visual field on a display disposed in the center visual field of the user.

9. The non-transitory computer-readable recording medium according to claim 7, wherein the process further comprises acquiring a correspondence between each pixel of the acquired image and a position of each pixel in the real space using depth information of each position in the real space obtained from a stereo camera.

* * * * *